US012629826B2

(12) United States Patent
Ding et al.

(10) Patent No.: US 12,629,826 B2
(45) Date of Patent: May 19, 2026

(54) METHOD FOR CALIBRATING ARTICULATED ROBOT, COMPUTER DEVICE AND READABLE STORAGE MEDIUM

(71) Applicants:SHANGHAI FLEXIV ROBOTICS TECHNOLOGY CO., LTD., Shanghai (CN); FLEXIV LTD., Grand Cayman (GB)

(72) Inventors: Houzhu Ding, Santa Clara, CA (US); Hao Jiang, Santa Clara, CA (US)

(73) Assignees: SHANGHAI FLEXIV ROBOTICS TECHNOLOGY CO., LTD., Shanghai (CN); FLEXIV LTD., Grand Cayman (GB)

( * ) Notice: Subject to any disclaimer, the term of this patent is extended or adjusted under 35 U.S.C. 154(b) by 122 days.

(21) Appl. No.: 18/568,426

(22) PCT Filed: Apr. 20, 2023

(86) PCT No.: PCT/CN2023/089385
§ 371 (c)(1),
(2) Date: Dec. 8, 2023

(87) PCT Pub. No.: WO2024/216564
PCT Pub. Date: Oct. 24, 2024

(65) Prior Publication Data
US 2025/0083315 A1 Mar. 13, 2025

(51) Int. Cl.
B25J 9/16 (2006.01)

(52) U.S. Cl.
CPC ........... B25J 9/1638 (2013.01); B25J 9/1641 (2013.01)

(58) Field of Classification Search
CPC ....... B25J 9/1638; B25J 9/1641; B25J 9/1692
See application file for complete search history.

(56) References Cited

U.S. PATENT DOCUMENTS

2004/0093119 A1* 5/2004 Gunnarsson ........... B25J 9/1638
700/245
2016/0221189 A1* 8/2016 Nilsson .................. B25J 9/1653
(Continued)

FOREIGN PATENT DOCUMENTS

CN 113547522 A 10/2021
CN 113927599 A 1/2022
(Continued)

OTHER PUBLICATIONS

Wang et al., "Inverse Kinematics Solution Algorithm for Redundant Manipulators Utilizing the Extended Jacobian Matrix" Science Technology and Engineering, 21 (16), pp. 6752-6757. Jul. 12, 2021.
(Continued)

*Primary Examiner* — Adam R Mott
*Assistant Examiner* — Heather J Keniry
(74) *Attorney, Agent, or Firm* — Ballard Spahr LLP

(57) ABSTRACT

The present disclosure relates to a method for calibrating an articulated robot, a computer device and a non-temporary computer-readable storage medium. The method includes: acquiring desired trajectory information regarding a desired trajectory of the end-effector; acquiring load information regarding a load subjected by the articulated robot, the load including a gravity load, an inertial load and an external load; obtaining, based on the desired trajectory information, joint position data indicating a joint position of the articulated robot; obtaining, based on the joint position data and the load information, end position change data indicating an end position change of the end-effector; and compensating, based on the end position change data, a position error of the end-effector according to a predetermined compensation strategy.

21 Claims, 5 Drawing Sheets

(56)          References Cited

U.S. PATENT DOCUMENTS

| | | | |
|---|---|---|---|
| 2022/0009095 A1 | 1/2022 | Huang et al. | |
| 2024/0139959 A1* | 5/2024 | Fu .......................... | B25J 9/1692 |

FOREIGN PATENT DOCUMENTS

| | | | |
|---|---|---|---|
| CN | 114454150 A | 5/2022 | |
| CN | 115502968 A | 12/2022 | |
| CN | 115972212 A | 4/2023 | |
| DE | 102019105871 A1 | 9/2020 | |
| EP | 1250986 A2 | 10/2002 | |
| JP | 2021181142 A | 11/2021 | |
| RU | 2696508 C1 | 8/2019 | |

OTHER PUBLICATIONS

Busson et al., "Task-oriented rigidity optimization for 7 DOF redundant manipulators", 6 pages, Jul. 31, 2017.
Office Action for Chinese Application No. 202310428197.8 mailed Apr. 28, 2025.
International Search Report and Written Opinion for International Application No. PCT/CN2023/089385 mailed Nov. 16, 2023.
Extended Search Report for European Application No. 23933441.0 mailed Feb. 6, 2026.

\* cited by examiner

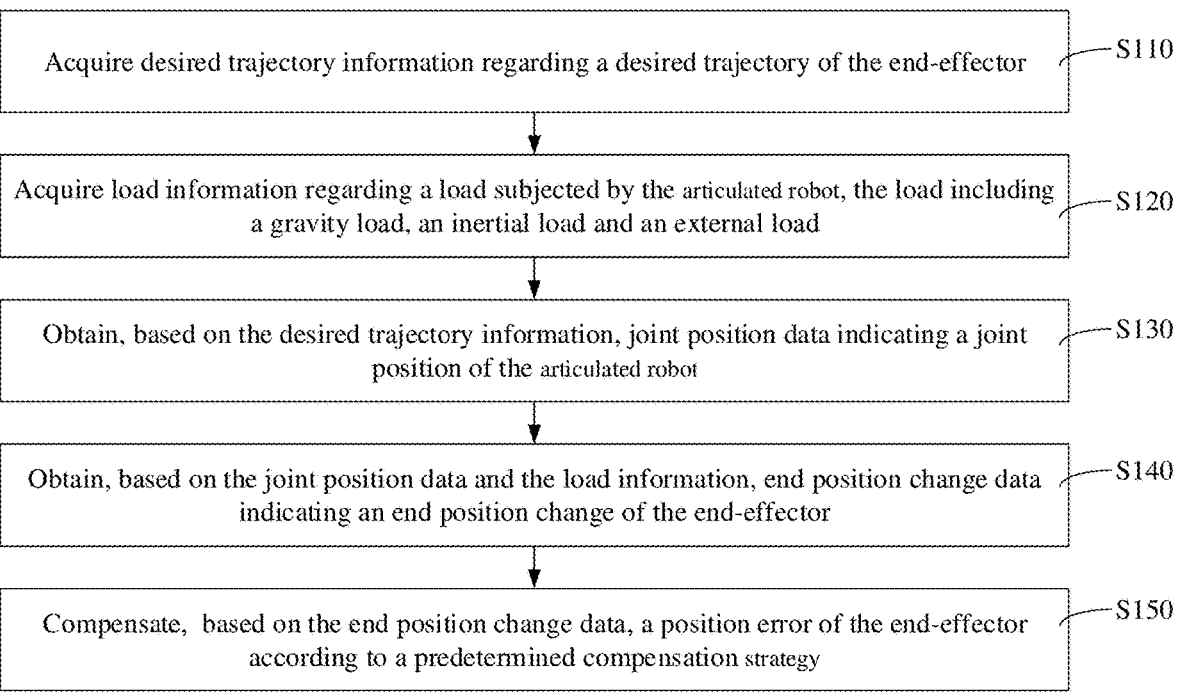

Acquire desired trajectory information regarding a desired trajectory of the end-effector ⌐S110

Acquire load information regarding a load subjected by the articulated robot, the load including a gravity load, an inertial load and an external load ⌐S120

Obtain, based on the desired trajectory information, joint position data indicating a joint position of the articulated robot ⌐S130

Obtain, based on the joint position data and the load information, end position change data indicating an end position change of the end-effector ⌐S140

Compensate, based on the end position change data, a position error of the end-effector according to a predetermined compensation strategy ⌐S150

FIG. 4

METHOD FOR CALIBRATING ARTICULATED ROBOT, COMPUTER DEVICE AND READABLE STORAGE MEDIUM

TECHNICAL FIELD

The present disclosure relates to the field of robotics, and in particular, to a method for calibrating an articulated robot, a computer device and a readable storage medium.

BACKGROUND

Industrial robots have a large workspace and degree of freedom, and can extend different actuators at an end to achieve different production tasks. At present, industrial robots are mostly in a tandem multi-chain structure with low joint stiffness, and a force or torque acting on the end of the robot can lead to a large position deviation, resulting in low positioning accuracy of the end under external loads. Positioning accuracy is one of the key properties of a robotic arm in advanced manufacturing or industrial applications, such as visual serving pick, placement tasks, and human robot interaction processes. The improvement of robot positioning accuracy will greatly expand the applications of the robotic arm. Generally, a positioning error mainly includes a geometric error and a non-geometric error. The geometric error is a dimensional error caused by manufacturing and assembling processes of parts of the robot, and the non-geometric error is mainly caused by a stiffness of the robot itself, a bandwidth of a controller, an ambient temperature, an external load, and other factors.

In conventional art, most of the industrial robots are calibrated based on a kinematic level, however, it is difficult to compensate for a deformation caused by the robot under external loads and its own gravity. By identifying the stiffness of a robot stiffness model, the error caused by the loads can be reduced.

However, due to the complexity of loading conditions in various robot poses, it is difficult to accurately calibrate in the robot workspace, and there is still a problem of poor positioning accuracy of an end-effector.

SUMMARY

Based on this, it is necessary to provide a method for calibrating an articulated robot, a computer device, and a non-temporary computer-readable storage medium capable of improving the positioning accuracy of the end-effector in response to the above technical problems.

A first aspect of the embodiment of the present disclosure provides a method for calibrating an articulated robot having an end-effector. The method includes: acquiring desired trajectory information regarding a desired trajectory of the end-effector; acquiring load information regarding a load subjected by the articulated robot, the load including a gravity load, an inertial load and an external load; obtaining, based on the desired trajectory information, joint position data indicating a joint position of the articulated robot; obtaining, based on the joint position data and the load information, end position change data indicating an end position change of the end-effector; and compensating, based on the end position change data, a position error of the end-effector according to a predetermined compensation strategy.

In the first aspect of the present disclosure, the obtaining, based on the joint position data and the load information, the end position change data indicating the end position change of the end-effector includes: calculating, based on a deformation coefficient for each link of the articulated robot under a unit load, link deformation data indicating deformations of all links of the articulated robot under the load; calculating, based on a deformation coefficient for each joint of the articulated robot under the unit load, joint deformation data indicating deformations of all joints of the articulated robot under the load; and obtaining, based on the joint position data, the link deformation data and the joint deformation data, the end position change data.

In the first aspect of the present disclosure, the obtaining, based on the joint position data, the link deformation data and the joint deformation data, the end position change data includes: obtaining, based on the link deformation data, the joint deformation data, the joint position data and a forward kinematic model of the articulated robot from a base to an end flange, the end position change data.

In the first aspect of the present disclosure, the method further includes: setting the predetermined compensation strategy as a first compensation strategy by receiving a user input. When the predetermined compensation strategy is set as the first compensation strategy, the compensating, based on the end position change data, the position error of the end-effector according to the predetermined compensation strategy includes: determining, based on the end position change data, joint position change data, and controlling a motion of the articulated robot using the joint position change data.

In the first aspect of the present disclosure, the joint position change data includes updated joint position data. The determining, based on the end position change data, the joint position change data, and controlling the motion of the articulated robot using the joint position change data includes: calculating a difference between the desired trajectory information and the end position change data to obtain updated trajectory data; processing, based on an inverse kinematic model of the articulated robot, the updated trajectory data to obtain the updated joint position data; and controlling the motion of the articulated robot using the updated joint position data.

In the first aspect of the present disclosure, the joint position data includes a first joint angle, and the joint position change data includes joint angle error data. The determining, based on the end position change data, the joint position change data, and controlling the motion of the articulated robot using the joint position change data includes: obtaining, based on the end position change data and a Jacobian matrix of a current pose of the articulated robot, the joint angle error data; and compensating the first joint angle using the joint angle error data, and controlling the motion of the articulated robot according to a compensated joint angle.

In the first aspect of the present disclosure, the joint position data includes a second joint angle. The obtaining, based on the desired trajectory information, the joint position data indicating the joint position of the articulated robot includes: processing, based on a Jacobian matrix of a current pose of the articulated robot, the desired trajectory information to obtain the second joint angle.

In the first aspect of the present disclosure, the method further includes: setting the predetermined compensation strategy as a second compensation strategy by receiving a user input. When the predetermined compensation strategy is set as the second compensation strategy, the compensating, based on the end position change data, the position error of the end-effector according to the predetermined compensation strategy includes: calculating a difference between the desired trajectory information and the end position change data to obtain planned trajectory data; and compensating an end position of the end-effector using the planned trajectory data.

In the first aspect of the present disclosure, the joint position data includes a third joint angle. The obtaining, based on the desired trajectory information, joint position data indicating the joint position of the articulated robot includes: constructing, based on the desired trajectory information, a joint angle optimization problem using a joint angle under an assumed corrected trajectory performed by the end-effector as a quantity to be optimized; determining, based on assumed corrected trajectory data, the joint angle under the corrected trajectory and a Jacobian matrix of a current pose of the articulated robot, a constraint condition of the joint angle optimization problem; and converging with a goal of minimizing a difference between the assumed corrected trajectory data and target trajectory data for optimization, to obtain the third joint angle.

In the first aspect of the present disclosure, the method further includes: setting the predetermined compensation strategy as a third compensation strategy by receiving a user input. When the predetermined compensation strategy is set as the third compensation strategy, the compensating, based on the end position change data, the position error of the end-effector according to the predetermined compensation strategy includes: calculating a difference between the desired trajectory information and the end position change data to obtain the target trajectory data; and compensating an end position of the end-effector using the target trajectory data.

A second aspect of the present disclosure provides a computer device including a processor and a memory storing processor-executable instructions. The processor-executable instructions, when executed by the processor, cause the processor to: acquire desired trajectory information regarding a desired trajectory of an end-effector of an articulated robot; acquire load information regarding a load subjected by the articulated robot, the load including a gravity load, an inertial load and an external load; obtain, based on the desired trajectory information, joint position data indicating a joint position of the articulated robot; obtain, based on the joint position data and the load information, end position change data indicating an end position change of the end-effector; and compensate, based on the end position change data, a position error of the end-effector according to a predetermined compensation strategy.

In the second aspect of the present disclosure, the obtaining, based on the joint position data and the load information, the end position change data indicating the end position change of the end-effector includes: calculating, based on a deformation coefficient for each link of the articulated robot under a unit load, link deformation data indicating deformations of all links of the articulated robot under the load; calculating, based on a deformation coefficient for each joint of the articulated robot under the unit load, joint deformation data indicating deformations of all joints of the articulated robot under the load; and obtaining, based on the joint position data, the link deformation data and the joint deformation data, the end position change data.

In the second aspect of the present disclosure, the obtaining, based on the joint position data, the link deformation data and the joint deformation data, the end position change data includes: obtaining, based on the link deformation data, the joint deformation data, the joint position data and a forward kinematic model of a base to an end flange of the articulated robot, the end position change data.

In the second aspect of the present disclosure, the processor-executable instructions, when executed by the processor, further cause the processor to: set the predetermined compensation strategy as a first compensation strategy by receiving a user input. When the predetermined compensation strategy is set as the first compensation strategy, the compensating, based on the end position change data, the position error of the end-effector according to the predetermined compensation strategy includes: determining, based on the end position change data, joint position change data, and controlling a motion of the articulated robot using the joint position change data.

In the second aspect of the present disclosure, the joint position change data includes updated joint position data. The determining, based on the end position change data, the joint position change data, and controlling the motion of the articulated robot using the joint position change data includes: calculating a difference between the desired trajectory information and the end position change data to obtain updated trajectory data; processing, based on an inverse kinematic model of the articulated robot, the updated trajectory data to obtain the updated joint position data; and controlling the motion of the articulated robot using the updated joint position data.

In the second aspect of the present disclosure, the joint position data includes a first joint angle, and the joint position change data includes joint angle error data. The determining, based on the end position change data, the joint position change data and controlling the motion of the articulated robot using the joint position change data includes: obtaining, based on the end position change data and a Jacobian matrix of a current pose of the articulated robot, the joint angle error data; and compensating the first joint angle using the joint angle error data, and controlling the motion of the articulated robot according to a compensated joint angle.

In the second aspect of the present disclosure, the joint position data includes a second joint angle. The obtaining, based on the desired trajectory information, joint position data indicating the joint position of the articulated robot includes: processing, based on a Jacobian matrix of a current pose of the articulated robot, the desired trajectory information to obtain the second joint angle.

In the second aspect of the present disclosure, the processor-executable instructions, when executed by the processor, further cause the processor to: set the predetermined compensation strategy as a second compensation strategy by receiving a user input. When the predetermined compensation strategy is set as the second compensation strategy, the compensating, based on the end position change data, the position error of the end-effector according to the predetermined compensation strategy includes: calculating a difference between the desired trajectory information and the end position change data to obtain planned trajectory data; and compensating an end position of the end-effector using the planned trajectory data.

In the second aspect of the present disclosure, the joint position data includes a third joint angle. The obtaining, based on the desired trajectory information, the joint position data indicating the joint position of the articulated robot includes: constructing, based on the desired trajectory information, a joint angle optimization problem using a joint angle under an assumed corrected trajectory performed by the end-effector as a quantity to be optimized; determining, based on assumed corrected trajectory data, the joint angle under the corrected trajectory and a Jacobian matrix of a current pose of the articulated robot, a constraint condition of the joint angle optimization problem; and converging with a goal of minimizing a difference between the assumed corrected trajectory data and target trajectory data for optimization, to obtain the third joint angle.

In the second aspect of the present disclosure, the processor-executable instructions, when executed by the processor, further cause the processor to: set the predetermined compensation strategy as a second compensation strategy by receiving a user input. When the predetermined compensation strategy is set as the second compensation strategy, the compensating, based on the end position change data, the position error of the end-effector according to the predetermined compensation strategy includes: calculating a difference between the desired trajectory information and the end position change data to obtain planned trajectory data; and compensating an end position of the end-effector using the planned trajectory data.

A third aspect of the present disclosure provides a non-temporary computer-readable storage medium storing processor-executable instructions. The processor-executable instructions, when executed by a processor, further cause the processor to: acquire desired trajectory information regarding a desired trajectory of an end-effector of an articulated robot; acquire load information regarding a load subjected by the articulated robot, the load including a gravity load, an inertial load and an external load; obtain, based on the desired trajectory information, joint position data indicating a joint position of the articulated robot; obtain, based on the joint position data and the load information, end position change data indicating an end position change of the end-effector; and compensate, based on the end position change data, a position error of the end-effector according to a predetermined compensation strategy.

One or more embodiments of the present disclosure will be described in detail below with reference to drawings. Other features, objects and advantages of the present disclosure will become more apparent from the description, drawings, and claims.

BRIEF DESCRIPTION OF THE DRAWINGS

In order to describe the technical solutions in the embodiments of the present disclosure more clearly, the following briefly introduces the accompanying drawings required for describing the embodiments. The accompanying drawings in the following description shows merely some embodiments of the present disclosure, and do not constitute a limitation to scope of the present disclosure.

FIG. 4 is a flow diagram illustrating a method for calibrating an articulated robot according to an embodiment of the present disclosure.

DETAILED DESCRIPTION OF THE EMBODIMENTS

In order to facilitate understanding of the present disclosure, the present disclosure will be described more fully below with reference to the relevant accompanying drawings. Embodiments of the present disclosure are presented in the accompanying drawings. However, the present disclosure may be implemented in many different forms and is not limited to the embodiments described herein. Rather, these embodiments are provided for the purpose of making the present disclosure more thorough and comprehensive.

Unless otherwise defined, all technical and scientific terms used herein have the same meaning as commonly understood by those skilled in the technical field to which the present disclosure belongs. The terms used herein in the specification of the application are for the purpose of describing specific embodiments only, and are not intended to limit the application.

In order to make the purpose, technical solutions and advantages of the present disclosure more clearly understood, the application will be further described in detail with the accompanying drawings and embodiments. It should be understood that the specific embodiments described here are only used to explain the application and not to limit the application.

Figure 1:
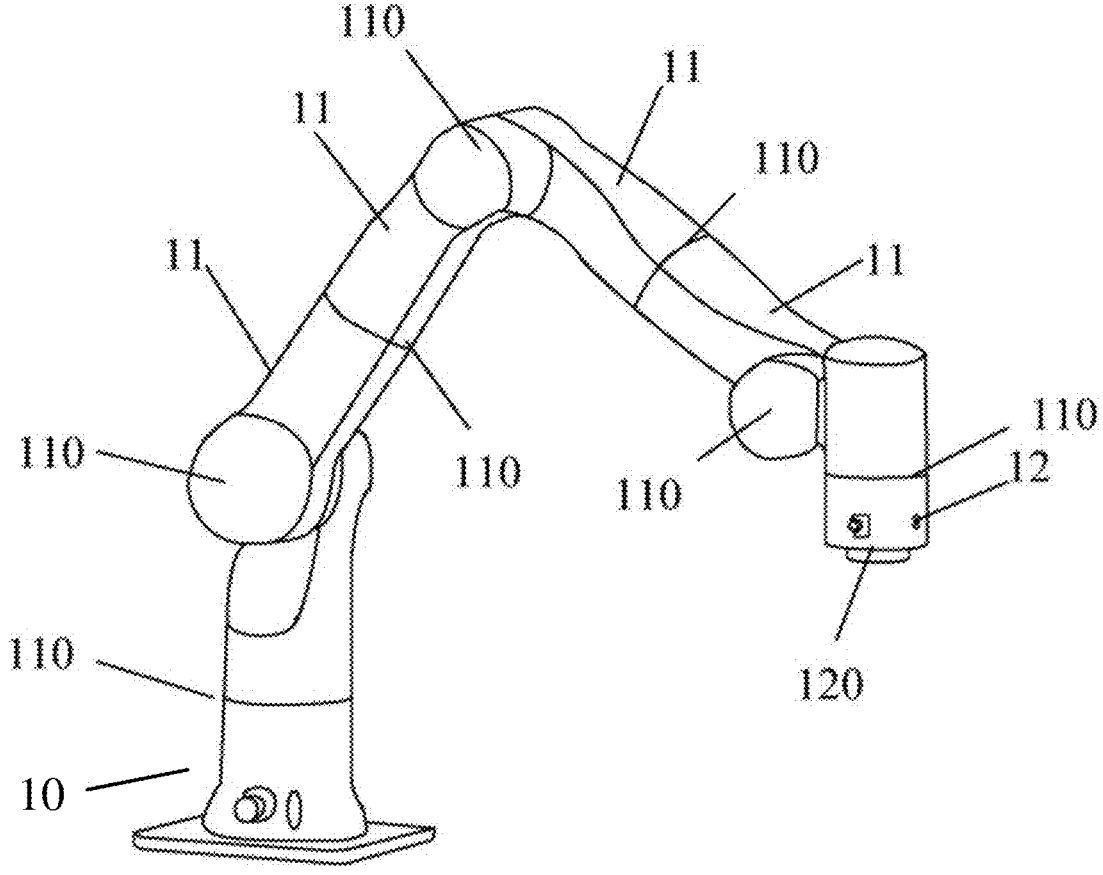
FIG. 1 is a schematic diagram illustrating an articulated robot according to an embodiment of the present disclosure.

FIG. 1 illustrates an exemplary articulated robot applied to an embodiment of the present disclosure, which is hereinafter referred to as a robot. The robot may be an industrial robot or any other type of robot, such as a humanoid robot. As shown in FIG. 1, the robot may include a base 10, a plurality of links 11, and an end-effector 12. The connections of each link 11 are referred to as joints 110. The proximal link is connected to the base 10 by a joint, the distal link is connected to the end-effector 12 by another joint, and two adjacent links are also connected by other joints. These joints 110 include pitch joints, roll joints, and other types of rotating joints. A corresponding actuator is arranged at each joint to drive the operation of each joint 110. The end-effector 12 may be equipped with an operating tool (not shown) through an end flange 120 to operate an object to be operated. The operating tool may be various tools that can be used to operate the object to be operated, for example a clamping member to clamp a workpiece to be operated.

Figure 2:
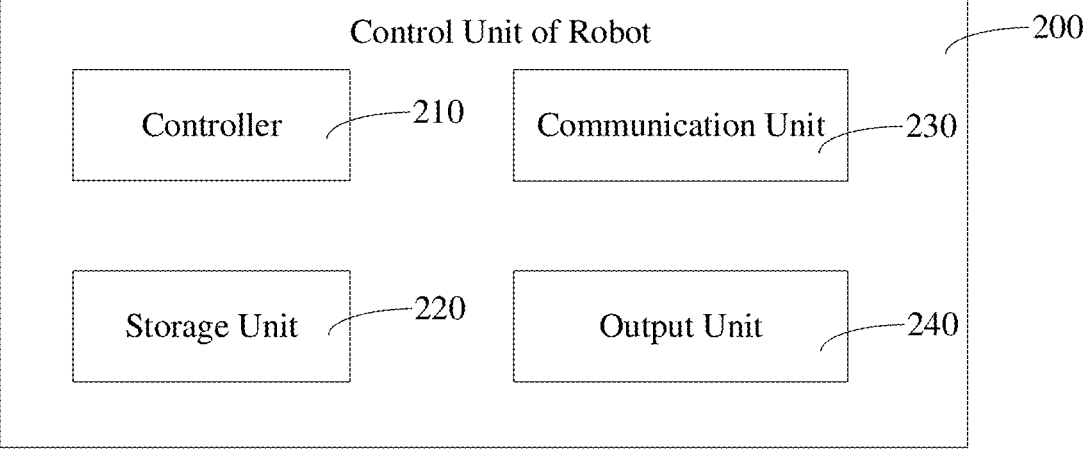
FIG. 2 is a block diagram illustrating a configuration of a control unit of an articulated robot according to an embodiment of the present disclosure.

The robot further includes a control unit. FIG. 2 is a block diagram illustrating a configuration of the control unit 200 of the robot applied to the embodiment of the present disclosure. The control unit 200 includes a controller 210, a storage unit 220, a communication unit 230, and an output unit 240. This control unit 200 may be configured to control a pose of the robot, an operation of the end-effector 12, or others.

The controller 210 includes one or more processors. Each processor may be a general-purpose processor or a specialized processor dedicated to specific processing, but is not limited thereto. The storage unit 220 includes one or more memories. Each memory may be a semiconductor memory, a magnetic surface memory or an optical memory, but is not limited thereto. The storage unit 220 stores any information for the operation of the robot.

The communication unit 230 includes one or more communication modules. The communication module may communicate with an external device such as a server through wireless communication or wired communication. In some embodiments, the robot may establish a communication connection with an external server through a cable via the communication unit 230. In other embodiments, the robot may be connected to a network of the server via the communication unit 230. The robot exchanges data with the server by using the communication unit 230.

The output unit 240 includes one or more signal interfaces. Each signal interface is connected to the actuator located at each joint and the end-effector 12 via a signal transmission line. The output unit 240 is configured to transmit the control commands generated by the controller 210 to the actuator located at each joint and the end-effector 12.

Figure 3:
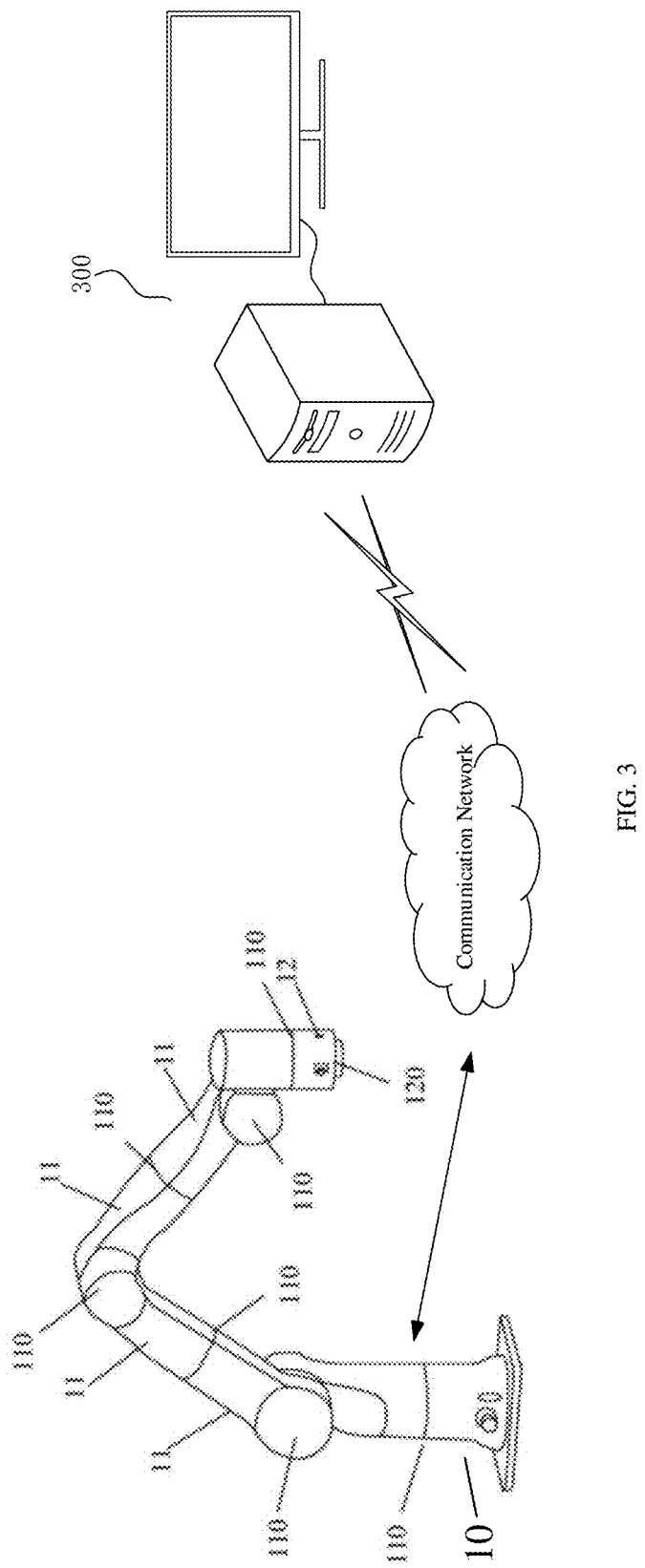
FIG. 3 is a schematic diagram illustrating an articulated robot system according to an embodiment of the present disclosure.

FIG. 3 is a schematic diagram illustrating a robot system. A workstation with one robot is shown exemplarily in the figure. It is understood that two or more robots may be arranged on the workstation. Each robot can exchange data with an external computing device 300 such as the server via a wired or wireless connection. The server sets operating states or conditions for the robot to control its operation.

The present disclosure provides a computer-implemented method for calibrating the articulated robot. FIG. 4 is a flow diagram illustrating an exemplary method performed by the computing device 300 such as the control unit 200 of the robot or the server to calibrate the robot.

In step S110, desired trajectory information regarding a desired trajectory of the end-effector 12 is acquired. The desired trajectory information of the end-effector 12 may include an end position, an end velocity, and an end acceleration. When the robot performs a position control task that follows the desired trajectory, the desired trajectory may be defined in an operational space (e.g., Cartesian space) as $x_d(t)$, $\dot{x}_d(t)$ and $\ddot{x}_d(t)$. The $x_d(t)$ represents a spatio-temporal sequence of the position of the end-effector 12, the $\dot{x}_d(t)$ represents a spatio-temporal sequence of the velocity of the end-effector 12, and the $\ddot{x}_d(t)$ represents a spatio-temporal sequence of the acceleration of the end-effector 12.

In step S120, load information regarding a load subjected by the robot is acquired. The load includes a gravity load, an inertial load, and an external load. Both the gravity load and the inertia load are a kind of dynamic load. The load information refers to a specific numerical magnitude of the load such as the gravity load, the inertial load and the external load. The gravity load subjected by the robot may be calculated based on a current posture of the robot and inherent parameters (such as the shape, size, weight, etc. of each link) of the robot, the inertial load may be calculated based on a current motion (such as the velocity, acceleration, etc. of each link) of the robot, and the external load may be measured by a force/torque sensor installed on the robot or calculated based on a current of a joint motor. In present disclosure, there is no specific limit on how to acquire the gravity load, the inertia load and the external load.

In step S130, joint position data indicating a joint position of the articulated robot is acquired based on the desired trajectory information.

In an embodiment, the joint position data may include a first joint angle. The desired trajectory information may be processed based on an inverse kinematic model of the articulated robot to obtain the first joint angle at which the end-effector 12 performs the desired trajectory. The first joint angle is the joint position data obtained directly based on the kinematic model of the articulated robot and the desired trajectory.

Specifically, a forward kinematic model of the robot may be established based on a base coordinate system, each joint coordinate system, an end coordinate system, and Denavit-Hartenberg (D-H) parameters and so on. The position of the end-effector 12 may be calculated from the forward kinematic model when the joint angle of the robot is known.

Conversely, the joint angle may be calculated from the inverse kinematic model when the end position is known. Therefore, the first joint angle $q_1(t)$ may be solved by substituting the end position $x_d(t)$ in the desired trajectory information into the inverse kinematic model, and furthermore, a first joint angular velocity $\dot{q}_1(t)$ may be obtained by deriving the first joint angle $q_1(t)$, and a first joint angular acceleration $\ddot{q}_1(t)$ may be obtained by deriving the first joint angular velocity $\dot{q}_1(t)$.

In another optional embodiment, the joint position data may include a second joint angle. The second joint angle may be obtained by processing the desired trajectory information based on a Jacobian matrix of a current pose of the robot. The second joint angle refers to the joint position data corresponding to the desired trajectory of the end-effector 12 of the robot calculated by using an incremental method to obtain a position change of each joint of the robot when the end-effector 12 of the robot has been moved a small distance.

Specifically, assuming that the end-effector 12 of the robot will move along a straight line $\delta X$ in a short period $\delta T$ (e.g., one second), the acceleration setting for the end position may be denoted by the following equation:

$$\delta\ddot{x}(t) = -w\cos(wt). \tag{1}$$

Then the end velocity is calculated by the following equation:

$$\delta\dot{x}(t) = \int_0^{\delta T} \delta\ddot{x}(t)dt = \int_0^{\delta T} -w\cos(wt)dt = \sin(w\delta T). \tag{2}$$

Then the end position is denoted by the following equation:

$$\delta X = \int_0^{\delta T} \delta\dot{x}(t)dt = \int_0^{\delta T} \sin(w\delta T)dt = \delta T\sin(w\delta T). \tag{3}$$

Therefore, $$w = \frac{\sin^{-1}\left(\frac{\delta X}{\delta T}\right)}{\delta T}$$

may be deduced.

Further, the joint angular velocity may be denoted by the following equation based on the Jacobian matrix of the current pose of the robot:

$$\delta\dot{q}=J^{\dagger}\delta\dot{x}+(1-J^{\dagger}J)\dot{\phi} \tag{4},$$

where J denotes the Jacobian matrix of the robot at the joint angle q(t), $J^{\dagger}$ is a pseudo-inverse matrix of J which represents a null space, and $J^{\dagger}=J^T(JJ^T)^{-1}$. I is a unit matrix.

The selection of $\dot{\phi}$ may be defined according to the position control task. For example, if the robot needs to fix one joint position (for robots with redundant degrees of freedom), $\phi$ may be designed to be achieved as a subtask, for example, $$\dot{\phi} = \alpha \frac{\partial \tau^T \tau}{\partial q},$$

where $\tau$ represents a joint torque, and $\alpha$ is a parameter set by a user as needed to represent how fast or slow each joint of the robot moves in the null space, which can minimize the use of torque during a motion of the robot.

Further, a relationship between the joint angle and the joint angular velocity is shown in the following equation:

$$q(t+1) = q(t) + \delta\dot{q}. \tag{5}$$

Therefore, according to the above derivation process, the corresponding second joint angle $q_2(t)$, the second joint angular velocity $\dot{q}_2(t)$ and the second joint angular acceleration $\ddot{q}_2(t)$ may be obtained by processing the desired trajectory information $x_d(t)$, $\dot{x}_d(t)$ and $\ddot{x}_d(t)$, using the incremental method of the desired trajectory.

In another optional embodiment, the joint position data may include a third joint angle. A joint angle optimization problem may be constructed based on the desired trajectory information with a joint angle under an assumed corrected trajectory performed by the end-effector 12 as a quantity to be optimized. Then a constraint condition of the joint angle optimization problem is determined based on assumed corrected trajectory data, the joint angle under the corrected trajectory and the Jacobian matrix of the current pose of the articulated robot. Finally, the third joint angle is obtained by converging with a goal of minimizing a difference between the assumed corrected trajectory data and target trajectory data for optimization. In this embodiment, the third joint angle is the joint position data corresponding to the corrected trajectory obtained by the optimization solution method.

Specifically, due to joint deformation and link deformation of the robot caused by its own gravity, an inertial force, and an external load from the end-effector 12, an actual trajectory of the end-effector 12 does not follow the desired trajectory. Considering a trajectory change amount occurring in the robot affected by the load, and assuming that the corrected trajectory data are:

$$x_d^a(t), \dot{x}_d^a(t) \text{ and } \ddot{x}_d^a(t),$$

the corresponding joint parameters of the robot under this corrected trajectory are $$q_d^a(t), \text{ and } \dot{q}_d^a(t) \text{ and } \ddot{q}_d^a(t),$$

and an end position change amount is $$\delta x_d^a(t).$$

Then the final expected target trajectory data of the end-effector 12 is $$(x_d(t) - \delta x_d^a(t)).$$

In order to improve a positioning accuracy of the end-effector 12, it is desired that the assumed corrected trajectory and the final target trajectory can be close to each other with the expectation that $$x_d^a(t) = x_d(t) - \delta x_d^a(t).$$

Further, with the joint angle $$q_d^a(t)$$

under the corrected trajectory performed by the end-effector 12 as the quantity to be optimized, a joint angle optimization model shown in the following equation below may be constructed:

$$\min_q [x_d^a(t) + \delta x_d^a(t) - x_d(t)]. \tag{6}$$

In the above model, the difference between the assumed corrected trajectory $$x_d^a(t)$$

and the final target trajectory $$(x_d(t) - \delta x_d^a(t))$$

will be optimized to a minimum.

$$\delta x_d^a(t)$$

may be obtained based on the joint parameters $$q_d^a(t), \dot{q}_d^a(t) \text{ and } \ddot{q}_d^a(t)$$

and the load subjected by the robot.

In addition, based on the assumed corrected trajectory data, the joint angle under the corrected trajectory and the Jacobian matrix of the current pose of the articulated robot, the constraint condition of the joint angle optimization model may be determined and denoted by the following equation:

$$\begin{cases} \dot{q}_d^a(t) = \dfrac{dq_d^a(t)}{dt}, \; \ddot{q}_d^a(t) = \dfrac{d\dot{q}_d^a(t)}{df} \\ \dot{x}_d^a(t) = \dfrac{dx_d^a(t)}{dt}, \; \ddot{x}_d^a(t) = \dfrac{dx_d^a(t)}{dt} \\ \dot{q}_d^a(t) = J^\dagger \dot{x}_d^a(t) + (I - J^\dagger J)\dot{\phi} \end{cases} \tag{7}$$

The null space of the robot can facilitate finding a best corrected path for robot deformation under the load. In an example, it defines that $$\dot{\phi} = \alpha \frac{\partial (x_d^a(t) + \delta x_d^a(t))}{\partial q}.$$

The optimization process for the above joint angle optimization model can be converged by following a numerical gradient to obtain the third joint angle $q_3(t)$, the third joint angular velocity $\dot{q}_3(t)$ and the third joint angular acceleration $\ddot{q}_3(t)$.

In step S140, end position change data indicating the end position change of the end-effector 12 is obtained based on the joint position data and the load information.

In an embodiment, the step S140 may include: calculating, based on a deformation coefficient for each link of the articulated robot under a unit load, link deformation data indicating deformations of all links of the articulated robot under the load; calculating, based on a deformation coefficient for each joint of the articulated robot under the unit load, joint deformation data indicating deformations of all joints of the articulated robot under the load; and obtaining, based on the joint position data, the link deformation data and the joint deformation data, the end position change data.

Figure 5:
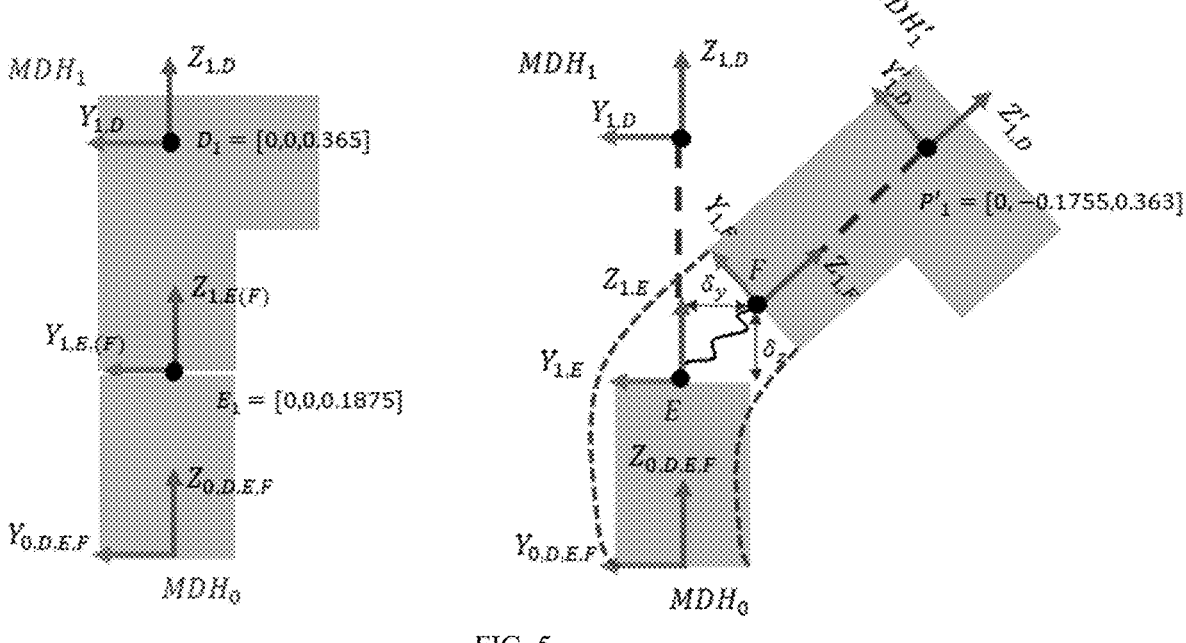
FIG. 5 is a schematic diagram showing an output surface of a single link from a coordinate system E before deformation to a coordinate system F after deformation according to an embodiment of the present disclosure.

Specifically, with reference to FIG. 1, in this embodiment, the robot has seven degrees of freedom, and includes eight distinct links. Due to the compliance or flexibility of material of a robot arm, the links and joints will deform in certain way due to the load such as the gravity load, the inertia load, the external load etc. at any posture. Taking the link deformation as an example, this embodiment treats each link as a deformation unit and uses finite element analysis to simulate the link deformation. Each link includes two main parts, a link shell made of aluminum, and a joint assembly half. The separation between the links is defined as two joint output flanges which provide a relative movement between the links. To analyze the deformation of a single link, it may be assumed that an input side of the link is fixed, the deformation of the single link would affect the successive links by altering the actual link-link connection surface at an output flange side. Therefore, the deformation of an output surface may be quantified as a deformation matrix containing coefficients that map a geometric information of the output surface before and after the deformation. This deformation matrix is a homogeneous transformation matrix which may be represented as two coordinate systems. The E coordinate system is used to represent the coordinate system in which the output surface is located before deformation, and the F coordinate system is used to represent the coordinate system in which the output surface is located after deformation. As shown in FIG. 5, the output surface is shown from the coordinate system E before deformation to the coordinate system F after deformation. The left side of FIG. 5 is a schematic diagram of a Modified Denavit Hartenberg (MDH) coordinate system under forward kinematics without the link deformation, and the right side of FIG. 5 is a schematic diagram of the coordinate system E and the coordinate system F of the output surface after the link deformation.

A deformation amount occurring at the output surface under loads in six degrees of freedom may be calculated by the simulation, where the loads in six degrees of freedom are divided into Newtonian force loads $F_x$, $F_y$ and $F_z$ applied to the output surface in three orthogonal directions (i.e., the x direction, the y direction, and the z direction), and torque loads $M_x$, $M_y$ and $M_z$ applied around a central axis passing through the output surface.

In addition to the finite element analysis simulation, the joint is designed as a symmetric assembly so the deformation caused by bending could be evaluated through experiments, which reveals a more realistic deformation coefficient. For the joint deformation, a bending coefficient also accounts for loads from all six degrees of freedom. With the combination of the link deformation and the joint deformation, the deformation of the whole robotic arm can be calculated continuously.

It should be understood that in addition to the finite element analysis and experimental testing methods, there are other ways to acquire the corresponding relationship between the deformation of the joints and links of the robot and the load of the robot, which is not limited thereto.

The homogeneous transformation matrix between the coordinate system E and the coordinate system F caused by the joint is shown in the following in equation:

$$_F^E T_{joint} = \begin{bmatrix} _E^F R & T \\ 0 & 1 \end{bmatrix} = \begin{bmatrix} 1 & -\theta_z & \theta_y & \delta_x \\ \theta_z & 1 & -\theta_x & \delta_y \\ -\theta_y & \theta_x & 1 & \delta_z \\ 0 & 0 & 0 & 1 \end{bmatrix}, \tag{8}$$

where $$_E^F R$$

represents a rotational deformation angle matrix of the joint affected by the load, for example, $\theta_x$ represents a rotation angle of the joint along the x-axis under the load. T represents a translational deformation matrix of the joint affected by the load, for example, $\delta_x$ represents a translational deformation amount of the joint along the x-axis under the load.

In a specific example, based on the experimental results on the joint deformation, the specific value of $\theta_x$ for the third, fourth, fifth, sixth and seventh joints of the seven joints is shown in the following equation:

$$\theta_x = 2.14 \times 10^{-5} \text{rad}/(N \cdot M), \tag{9}$$

and the specific value of $\theta_y$ for the first and second joints is shown in the following equation:

$$\theta_y = 1.17 \times 10^{-5} \text{rad}/(N \cdot M). \tag{10}$$

In addition, to calculate the gravity load and the dynamic load, a recursive Newton-Euler method may be used to precisely calculate a reaction load on each link due to gravity and inertial force based on the coordinate system E, thereby obtaining an actual load.

Constructing the coordinate system E and the coordinate system F on the output surface of the link is equivalent to adding a virtual joint at each joint to represent deformation. Each virtual joint has six degrees of freedom, and the movement under each degree of freedom is quantified by the homogeneous transformation matrix and the actual load.

Taking the link as an example and referring to the above equation (8), the deformation coefficient for the link caused by a unit torque load (1N·M) along the j direction is denoted by the matrix shown in the following equation:

$$
{}_{F}^{E}C_{link_{i,M_j}} = \begin{bmatrix} 1 & -\theta_{z,M_j} & \theta_{y,M_j} & \delta_{x,M_j} \\ \theta_{z,M_j} & 1 & -\theta_{x,M_j} & \delta_{y,M_j} \\ -\theta_{y,M_j} & \theta_{x,M_j} & 1 & \delta_{z,M_j} \\ 0 & 0 & 0 & 1 \end{bmatrix}_{(1N \cdot M)}, \tag{11}
$$

where i=0, . . . , 7, and j=x, y, z.

The deformation coefficient for the link caused by a unit Newtonian force load (1N) along the j direction is denoted by the matrix shown in the following equation:

$$
{}_{F}^{E}C_{link_{i,F_j}} = \begin{bmatrix} 1 & -\theta_{z,F_j} & \theta_{y,F_j} & \delta_{x,F_j} \\ \theta_{z,F_j} & 1 & -\theta_{x,F_j} & \delta_{y,F_j} \\ -\theta_{y,F_j} & \theta_{x,F_j} & 1 & \delta_{z,F_j} \\ 0 & 0 & 0 & 1 \end{bmatrix}_{(1N)}. \tag{12}
$$

Therefore, according to the above equation (11) and the above equation (12), the link deformation data of the link affected by the load between the coordinate system E and the coordinate system F is shown in the following equation:

$$
{}_{F}^{E}T_{i,L} = \Sigma_{j=x,y,z}F_{i,j} \cdot \left( {}_{F}^{E}C_{link_{i,F_j}} - I \right) + \Sigma_{j=x,y,z}M_{i,j} \cdot \left( {}_{F}^{E}C_{link_{i,M_j}} - I \right) + I, \tag{13}
$$

where I is a unit matrix.

Similarly, the joint deformation data of the joint affected by the load between the coordinate system E and the coordinate system F is shown in the following equation:

$$
{}_{F}^{E}T_{i,J} = \Sigma_{j=x,y,z}F_{i,j} \cdot \left( {}_{F}^{E}C_{joint_{i,F_j}} - I \right) + \Sigma_{j=x,y,z}M_{i,j} \cdot \left( {}_{F}^{E}C_{joint_{i,M_j}} - I \right) + I. \tag{14}
$$

In some embodiments, the obtaining, based on the joint position data, the end position change data, the link deformation data and the joint deformation data includes: obtaining, based on the link deformation data, the joint deformation data, the joint position data and the forward kinematic model of the base to the end flange of the robot, the end position change data.

Specifically, firstly, the transformation matrix between the MDH coordinate system and the coordinate system E of the robot is shown in the following equation:

$$
{}_{E}^{D}T_i = \begin{bmatrix} 1 & 0 & 0 & 0 \\ 0 & 1 & 0 & 0 \\ 0 & 0 & 1 & {}_{E}^{D}\delta_{z,i} \\ 0 & 0 & 0 & 1 \end{bmatrix}, \tag{15}
$$

where $$
{}_{E}^{D}\delta_{z,i}
$$

represents an offset of the two coordinate systems in the z-direction, which may be measured in the CAD model.

Secondly, the transformation matrix between the MDH$_{i-1}$ coordinate system and the MDH$_i$ coordinate system of the robot is shown in the following equation:

$$
{}_{i}^{i-1}T = \begin{bmatrix} c\theta_i & -s\theta_i & 0 & a_i \\ s\theta_i c\alpha_i & c\theta_i c\alpha_i & 0 & -s\alpha_i \cdot d_i \\ s\theta_i s\alpha & c\theta_i s\alpha_i & 1 & c\alpha_i \cdot d_i \\ 0 & 0 & 0 & 1 \end{bmatrix}, \tag{16}
$$

where i=1, 2, . . . , 8, $a_i$ is a linkage length in MDH parameters, $\alpha_i$ is a linkage torsion angle, $d_i$ is a linkage offset, $\theta_i$ is the joint angle, $c\theta_i$ represents $\cos\theta_i$, and $s\theta_i$ represents $\sin\theta_i$.

Finally, the forward kinematic model of the robot from the base to the end flange is denoted by the transformation matrix shown in the following equation:

$$
T_{i\_base} = \Pi_{i=1}^{8}\left( {}_{i}^{i-1}T \cdot {}_{E}^{D}T_i \cdot {}_{F}^{E}T_i \cdot {}_{E}^{D}T_i^{-1} \right). \tag{17}
$$

Further, by substituting the above first joint angle $q_1(t)$ into the above forward kinematic model for solving, the end position change data $\delta x_1(t)$ caused by the load is obtained. The end position change data includes change amounts in x, y and z directions.

Similarly, the end position change data $\delta x_2(t)$ is obtained by substituting the above second joint angle $q_2(t)$ into the above forward kinematic model for solving. The end position change data $\delta x_3(t)$ (i.e., $$
\delta x_d^a(t)
$$

in the above embodiment) is obtained by substituting the above third joint angle $q_3(t)$ into the above forward kinematic model for solving.

Returning to FIG. 4, in step S150, a position error of the end-effector 12 is compensated according to a predetermined compensation strategy based on the end position change data.

In an embodiment, the robot calibration method further includes receiving a user input, and setting the predetermined compensation strategy as a first compensation strategy based on the user input. When the predetermined compensation strategy is set as the first compensation strategy, the step S150 includes: determining, based on the end position change data, joint position change data, and controlling the motion of the robot using the joint position change data.

In an embodiment, the joint position change data includes updated joint position data. The determining, based on the end position change data, the joint position change data, and controlling the motion of the articulated robot using the joint position change data may include: calculating a difference between the desired trajectory information and the end position change data to obtain updated trajectory data; processing, based on an inverse kinematic model of the articulated robot, the updated trajectory data to obtain the updated joint position data; and controlling the motion of the articulated robot using the updated joint position data.

Specifically, the end position change data (i.e., an end position error) calculated on the end-effector 12 is set to a negative position control target value. When the end position change data $\delta x_1(t)$ is obtained, the updated trajectory data is $$x'_{1_d}(t) = x_d(t) - \delta x_1(t),$$

so an updated joint angle can be obtained by solving the inverse kinematic model, and the updated joint position data is $$q^{ik}(t) = ikine\left(x'_{1_d}(t)\right).$$

If the robot follows the updated joint parameters for movement, a positioning error of the end-effector 12 caused by the load will be eliminated.

In another optional embodiment, the joint position change data includes joint angle error data. Referring to the calculation idea of using the Jacobian matrix of the current pose of the robot to process the desired trajectory information to obtain the second joint angle in the above embodiment, the joint angle error data is obtained based on the end position change data $\delta x_1(t)$ and the Jacobian matrix of the current pose of the robot, and then the joint angle error data is compensated into the original first joint angle, so that the end-effector 12 reaches a desired end point based on a compensated joint angle.

In the first compensation strategy described above, the joint position change data is calculated from the end position error affected by the load, and then the joint position change data is used to control the motion of the robot, achieving point compensation. One or more path points can be compensated as needed during the robot motion, which corrects a motion trajectory of the robot. The robot moves based on a new joint angle with the error eliminated, ensuring a positioning accuracy of the end-effector 12.

In another optional embodiment, the robot calibration method further includes receiving a user input, and setting the predetermined compensation strategy as a second compensation strategy based on the user input. When the predetermined compensation strategy is set as the second compensation strategy, the step S150 includes: calculating a difference between the desired trajectory information and the end position change data to obtain planned trajectory data; and compensating an end position of the end-effector 12 using the planned trajectory data.

Specifically, the difference between the $x_d$ (t) of the desired trajectory information and the end position change data $\delta x_2(t)$ is calculated to obtain the planned trajectory data, as shown in the following equation:

$$x2'_d(t) = x_d(t) - \delta x_2(t). \tag{18}$$

Using a new planned trajectory, the robot will move accordingly along a desired path.

In a further optional embodiment, the robot calibration method further includes receiving a user input, and setting the predetermined compensation strategy as a third compensation strategy based on the user input. When the predetermined compensation strategy is set as the third compensation strategy, the step S150 includes: calculating a difference between the desired trajectory information and the end position change data to obtain the target trajectory data; and compensating an end position of the end-effector using the target trajectory data.

Specifically, the difference between the $x_d$ (t) of the desired trajectory information and the end position change data $\delta x_3(t)$ is calculated to obtain the target trajectory data, as shown in the following equation:

$$x3'_d(t) = x_d(t) - \delta x_3(t). \tag{19}$$

The robot moves along the updated target trajectory, which will effectively improve the positioning accuracy of the end-effector 12.

The second compensation strategy and the third compensation strategy described above are both pre-planning the trajectory, but the method for calculating the joint angle is different. However, both of them ultimately enable the end-effector 12 to move along the updated path and ultimately reach the desired end position, which also improves the positioning accuracy of the end-effector 12. By updating the whole desired path planning, an advance compensation of the whole desired trajectory of the robot can be realized, making the actual motion trajectory of the robot affected by deformation more consistent with the desired trajectory compared to an uncorrected situation.

The compensation methods proposed in the present disclosure may all be written as plug-in software libraries, which are versatile and easy to use in any type of robot.

In an embodiment, another trajectory compensation method is also provided.

Since trajectory compensation requires the robot to move along a corrected absolute path, the trajectory compensation is equivalent to dynamically updating the MDH kinematic parameters of the robot. By using the kinematic model shown in the following equation (20), real-time path compensation is performed:

$$MDH_{cali} = \text{MDH\_Update}(q(t), \dot{q}(t), \ddot{q}(t), f(t)), \tag{20}$$

where $MDH_{cali}$ represents a calibrated MDH kinematic model and f(t) represents the load applied to the end-effector 12.

During each control cycle, the kinematic parameters are updated to ensure that a trajectory calculation is also correct. This requires re-modeling each robot using a new coordinate system.

It should be understood that although the individual steps in the flowcharts involved in the embodiments as described above are shown sequentially as indicated by the arrows, the steps are not necessarily performed sequentially in the order indicated by the arrows. Unless explicitly stated herein, these steps are performed in no strict order and they can be performed in any other order. Moreover, at least some of the steps in the flowcharts involved in the embodiments as described above may include multiple steps or multiple stages that are not necessarily performed at the same moment of completion, but may be performed at different moments, and the order in which these steps or stages are performed is not necessarily sequential, but may be performed alternately or alternately with other steps or at least some of the steps or stages in other steps.

The present disclosure further provides a computer device including a processor and a memory storing processor-executable instructions. The processor-executable instructions, when executed by the processor, cause the processor to: acquire desired trajectory information regarding a desired trajectory of the end-effector 12; acquire load information regarding a load subjected by the articulated robot, the load including a gravity load, an inertial load and an external load; obtain, based on the desired trajectory information, joint position data indicating a joint position of the articulated robot; obtain, based on the joint position data and the load information, end position change data indicating an end position change of the end-effector 12; and compensate, based on the end position change data, a position error of the end-effector 12 according to a predetermined compensation strategy.

In an embodiment, the obtaining, based on the joint position data and the load information, the end position change data indicating the end position change of the end-effector 12 includes: calculating, based on a deformation coefficient for each link of the articulated robot under a unit load, link deformation data indicating deformations of all links of the articulated robot under the load; calculating, based on a deformation coefficient for each joint of the articulated robot under the unit load, joint deformation data indicating deformations of all joints of the articulated robot under the load; and obtaining, based on the joint position data, the link deformation data and the joint deformation data, the end position change data.

In an embodiment, the obtaining, based on the joint position data, the link deformation data and the joint deformation data, the end position change data includes: obtaining, based on the link deformation data, the joint deformation data, the joint position data and a forward kinematic model of a base, the end position change data to an end flange of the articulated robot.

In an embodiment, the processor-executable instructions, when executed by the processor, further cause the processor to: set the predetermined compensation strategy as a first compensation strategy by receiving a user input. When the predetermined compensation strategy is set as the first compensation strategy, the compensating, based on the end position change data, the position error of the end-effector 12 according to the predetermined compensation strategy includes: determining, based on the end position change data, joint position change data, and controlling a motion of the articulated robot using the joint position change data.

In an embodiment, the joint position change data includes updated joint position data. The determining, based on the end position change data, the joint position change data, and controlling the motion of the articulated robot using the joint position change data includes: calculating a difference between the desired trajectory information and the end position change data to obtain updated trajectory data; processing, based on an inverse kinematic model of the articulated robot, the updated trajectory data to obtain the updated joint position data; and controlling the motion of the articulated robot using the updated joint position data.

In an embodiment, the joint position data includes a first joint angle, and the joint position change data includes joint angle error data. The determining, based on the end position change data, the joint position change data, and controlling the motion of the articulated robot using the joint position change data includes: obtaining, based on the end position change data and a Jacobian matrix of a current pose of the articulated robot, the joint angle error data; and compensating the first joint angle using the joint angle error data, and controlling the motion of the articulated robot according to a compensated joint angle.

In an embodiment, the joint position data includes a second joint angle. The obtaining, based on the desired trajectory information, the joint position data indicating the joint position of the articulated robot includes: processing, based on a Jacobian matrix of a current pose of the articulated robot, the desired trajectory information to obtain the second joint angle.

In an embodiment, the processor-executable instructions, when executed by the processor, further cause the processor to: set the predetermined compensation strategy as a second compensation strategy by receiving a user input. When the predetermined compensation strategy is set as the second compensation strategy, the compensating, based on the end position change data, the position error of the end-effector 12 according to the predetermined compensation strategy includes: calculating a difference between the desired trajectory information and the end position change data to obtain planned trajectory data; and compensating an end position of the end-effector 12 using the planned trajectory data.

In an embodiment, the joint position data includes a third joint angle. The obtaining, based on the desired trajectory information, the joint position data indicating the joint position of the articulated robot includes: constructing, based on the desired trajectory information, a joint angle optimization problem using a joint angle under an assumed corrected trajectory performed by the end-effector 12 as a quantity to be optimized; determining, based on assumed corrected trajectory data, the joint angle under the corrected trajectory and a Jacobian matrix of a current pose of the articulated robot, a constraint condition of the joint angle optimization problem; and converging with a goal of minimizing a difference between the assumed corrected trajectory data and target trajectory data for optimization, to obtain the third joint angle.

In an embodiment, the processor-executable instructions, when executed by the processor, further cause the processor to: set the predetermined compensation strategy as a third compensation strategy by receiving a user input. When the predetermined compensation strategy is set as the third compensation strategy, the compensating, based on the end position change data, the position error of the end-effector 12 according to the predetermined compensation strategy includes: calculating a difference between the desired trajectory information and the end position change data to obtain the target trajectory data; and compensating an end position of the end-effector 12 using the target trajectory data.

The present disclosure further provides a non-temporary computer-readable storage medium storing processor-executable instructions. The processor-executable instructions, when executed by a processor, cause the processor to implement the steps in each of the method embodiments described above.

A person of ordinary skill in the art can understand that implementation of all or part of the processes in the methods of the above embodiments can be completed by instructing the relevant hardware through a computer program. The computer program may be stored in a non-volatile computer-readable storage medium. When the computer program is executed, it may include the processes in the embodiments of the above methods. Any reference to memory, database or other medium used in the embodiments provided in the present disclosure may include at least one of a non-volatile and a volatile memory. The non-volatile memory may include a read-only memory (ROM), a magnetic tape, a floppy disk, a flash memory, an optical memory, a high-density embedded non-volatile memory, a resistive random access memory (ReRAM), a magneto resistive random access memory (MRAM), a ferroelectric random access memory (FRAM), a phase change memory (PCM), or a graphene memory, etc. The volatile memory may include a random access memory (RAM) or an external cache memory, etc. As an illustration rather than a limitation, the random access memory may be in various forms, such as a static random access memory (SRAM) or a dynamic random access memory (DRAM), etc. The databases involved in the embodiments provided by the present disclosure may include at least one of a relational database and a non-relational database. The non-relational database can include, without limitation, a blockchain-based distributed database, etc. The processor involved in the embodiments provided by the present disclosure may be a general purpose processor, a central processor, a graphics processor, a digital signal processor, a programmable logic device, a data processing logic device based on quantum computation, and the like, without limitation.

The technical features in the above embodiments can be combined arbitrarily. For concise description, not all possible combinations of the technical features in the above embodiments are described. However, all the combinations of the technical features are to be considered as falling within the scope described in this specification provided that they do not conflict with each other.

The above-mentioned embodiments only describe several implementations of the present disclosure, and their description is specific and detailed, but should not be understood as a limitation on the patent scope of the invention. It should be pointed out that for those skilled in the art may further make variations and improvements without departing from the conception of the present disclosure, and these all fall within the protection scope of the present disclosure. Therefore, the protection scope of the present disclosure should be subject to the appended claims.

What is claimed is:

1. A method for calibrating an articulated robot having an end-effector, the method comprising:

acquiring desired trajectory information regarding a desired trajectory of the end-effector;

acquiring load information regarding a load experienced by the articulated robot, the load comprising a gravity load, an inertial load and an external load;

obtaining, based on the desired trajectory information, joint position data indicating a joint position of the articulated robot;

obtaining, based on the joint position data and the load information, end position change data indicating an end position change of the end-effector;

receiving a user input and setting a predetermined compensation strategy as one of a first compensation strategy, a second compensation strategy, or a third compensation strategy based on the user input; and compensating, based on the end position change data, a position error of the end-effector according to a predetermined compensation strategy.

2. The method of claim 1, wherein the obtaining, based on the joint position data and the load information, the end position change data indicating the end position change of the end-effector comprises:

calculating, based on a deformation coefficient for each link of the articulated robot under a unit load, link deformation data indicating deformations of all links of the articulated robot under the load;

calculating, based on a deformation coefficient for each joint of the articulated robot under the unit load, joint deformation data indicating deformations of all joints of the articulated robot under the load; and obtaining, based on the joint position data, the link deformation data and the joint deformation data, the end position change data.

3. The method of claim 2, wherein the obtaining, based on the joint position data, the link deformation data and the joint deformation data, the end position change data comprises:

obtaining, based on the link deformation data, the joint deformation data, the joint position data and a forward kinematic model of the articulated robot from a base to an end flange, the end position change data.

4. The method of claim 1, wherein when the predetermined compensation strategy is set as the first compensation strategy, the compensating, based on the end position change data, the position error of the end-effector according to the predetermined compensation strategy comprises:

determining, based on the end position change data, joint position change data, and controlling a motion of the articulated robot using the joint position change data.

5. The method of claim 4, wherein the joint position change data comprises updated joint position data, and wherein the determining, based on the end position change data, the joint position change data, and controlling the motion of the articulated robot using the joint position change data comprises:

calculating a difference between the desired trajectory information and the end position change data to obtain updated trajectory data;

processing, based on an inverse kinematic model of the articulated robot, the updated trajectory data to obtain the updated joint position data; and controlling the motion of the articulated robot using the updated joint position data.

6. The method of claim 4, wherein the joint position data comprises a first joint angle, and the joint position change data comprises joint angle error data, and wherein the determining joint position change data based on the end position change data and controlling the motion of the articulated robot using the joint position change data comprises:

obtaining the joint angle error data based on the end position change data and a Jacobian matrix of a current pose of the articulated robot; and compensating the first joint angle using the joint angle error data, and controlling the motion of the articulated robot according to a compensated joint angle.

7. The method of claim 1, wherein the joint position data comprises a second joint angle, and wherein the obtaining, based on the desired trajectory information, the joint position data indicating the joint position of the articulated robot comprises:

processing, based on a Jacobian matrix of a current pose of the articulated robot, the desired trajectory information to obtain the second joint angle.

8. The method of claim 7, wherein when the predetermined compensation strategy is set as the second compensation strategy, the compensating, based on the end position change data, the position error of the end-effector according to the predetermined compensation strategy comprising:

calculating a difference between the desired trajectory information and the end position change data to obtain planned trajectory data; and compensating an end position of the end-effector using the planned trajectory data.

9. The method of claim 1, wherein the joint position data comprises a third joint angle, and wherein the obtaining, based on the desired trajectory information, the joint position data indicating the joint position of the articulated robot comprises:

constructing, based on the desired trajectory information, a joint angle optimization problem using a joint angle under an assumed corrected trajectory performed by the end-effector as a quantity to be optimized;

determining, based on assumed corrected trajectory data, the joint angle under the corrected trajectory and a Jacobian matrix of a current pose of the articulated robot, a constraint condition of the joint angle optimization problem; and converging with a goal of minimizing a difference between the assumed corrected trajectory data and target trajectory data for optimization, to obtain the third joint angle.

10. The method of claim 9, wherein when the predetermined compensation strategy is set as the third compensation strategy, the compensating, based on the end position change data, the position error of the end-effector according to the predetermined compensation strategy comprising:

calculating a difference between the desired trajectory information and the end position change data to obtain the target trajectory data; and compensating an end position of the end-effector using the target trajectory data.

11. A computer device comprising a processor and a memory storing processor-executable instructions, wherein the processor-executable instructions, when executed by the processor, cause the processor to:

acquire desired trajectory information regarding a desired trajectory of an end-effector of an articulated robot;

acquire load information regarding a load experienced by the articulated robot, the load comprising a gravity load, an inertial load and an external load;

obtain, based on the desired trajectory information, joint position data indicating a joint position of the articulated robot;

obtain, based on the joint position data and the load information, end position change data indicating an end position change of the end-effector;

receive a user input and set a predetermined compensation strategy as one of a first compensation strategy, a second compensation strategy, or a third compensation strategy based on the user input; and compensate, based on the end position change data, a position error of the end-effector according to a predetermined compensation strategy.

12. The computer device of claim 11, wherein the obtaining, based on the joint position data and the load information, the end position change data comprises:

calculating, based on a deformation coefficient for each link of the articulated robot under a unit load, link deformation data indicating deformations of all links of the articulated robot under the load;

calculating, based on a deformation coefficient for each joint of the articulated robot under the unit load, joint deformation data indicating deformations of all joints of the articulated robot under the load; and obtaining, based on the joint position data, the link deformation data and the joint deformation data, the end position change data.

13. The computer device of claim 12, wherein the obtaining, based on the joint position data, the link deformation data and the joint deformation data, the end position change data comprises:

obtaining the end position change data based on the link deformation data, the joint deformation data, the joint position data and a forward kinematic model of a base to an end flange of the articulated robot.

14. The computer device of claim 11, wherein when the predetermined compensation strategy is set as the first compensation strategy, the compensating, based on the end position change data, the position error of the end-effector according to the predetermined compensation strategy comprising:

determining, based on the end position change data, joint position change data, and controlling a motion of the articulated robot using the joint position change data.

15. The computer device of claim 14, wherein the joint position change data comprises updated joint position data, and wherein the determining, based on the end position change data, the joint position change data, and controlling the motion of the articulated robot using the joint position change data comprising:

calculating a difference between the desired trajectory information and the end position change data to obtain updated trajectory data;

processing, based on an inverse kinematic model of the articulated robot, the updated trajectory data to obtain the updated joint position data; and controlling the motion of the articulated robot using the updated joint position data.

16. The computer device of claim 14, wherein the joint position data comprises a first joint angle, and the joint position change data comprises joint angle error data, and wherein the determining, based on the end position change data, the joint position change data, and controlling the motion of the articulated robot using the joint position change data comprises:

obtaining, based on the end position change data and a Jacobian matrix of a current pose of the articulated robot, the joint angle error data; and compensating the first joint angle using the joint angle error data, and controlling the motion of the articulated robot according to a compensated joint angle.

17. The computer device of claim 11, wherein the joint position data comprises a second joint angle, and wherein the obtaining, based on the desired trajectory information, the joint position data indicating the joint position of the articulated robot comprising:

processing, based on a Jacobian matrix of a current pose of the articulated robot to obtain the second joint angle, the desired trajectory information.

18. The computer device of claim 17, wherein when the predetermined compensation strategy is set as the second compensation strategy, the compensating, based on the end position change data, the position error of the end-effector according to the predetermined compensation strategy comprising:

calculating a difference between the desired trajectory information and the end position change data to obtain planned trajectory data; and compensating an end position of the end-effector using the planned trajectory data.

19. The computer device of claim 11, wherein the joint position data comprises a third joint angle, and wherein the obtaining, based on the desired trajectory information, the joint position data indicating the joint position of the articulated robot comprising:

constructing, based on the desired trajectory information, a joint angle optimization problem using a joint angle under an assumed corrected trajectory performed by the end-effector as a quantity to be optimized;

determining, based on assumed corrected trajectory data, the joint angle under the corrected trajectory and a Jacobian matrix of a current pose of the articulated robot, a constraint condition of the joint angle optimization problem; and converging with a goal of minimizing a difference between the assumed corrected trajectory data and target trajectory data for optimization, to obtain the third joint angle.

20. The computer device of claim 19, wherein when the predetermined compensation strategy is set as the third compensation strategy, the compensating, based on the end position change data, the position error of the end-effector according to the predetermined compensation strategy comprising:

calculating a difference between the desired trajectory information and the end position change data to obtain the target trajectory data; and compensating an end position of the end-effector using the target trajectory data.

21. A non-temporary computer-readable storage medium storing processor-executable instructions, wherein the processor-executable instructions, when executed by a processor, cause the processor to:

acquire desired trajectory information regarding a desired trajectory of an end-effector of an articulated robot;

acquire load information regarding a load experienced by the articulated robot, the load comprising a gravity load, an inertial load and an external load;

obtain, based on the desired trajectory information, joint position data indicating a joint position of the articulated robot;

obtain, based on the joint position data and the load information, end position change data indicating an end position change of the end-effector;

receive a user input and set a predetermined compensation strategy as one of a first compensation strategy, a second compensation strategy, or a third compensation strategy based on the user input; and compensate, based on the end position change data, a position error of the end-effector according to a predetermined compensation strategy.

* * * * *